Jan. 3, 1961   F. O. RIGGINS ET AL   2,967,298
MULTI-SELECTOR CODED ILLUMINATOR MODULE
Filed Feb. 7, 1958   5 Sheets-Sheet 1
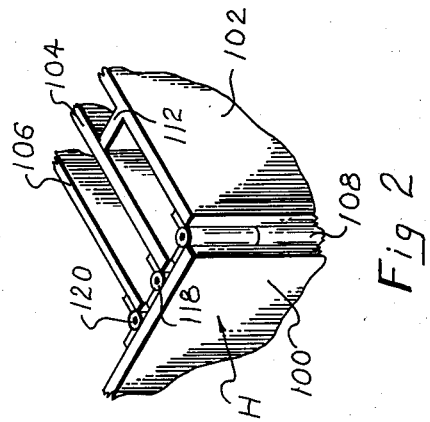
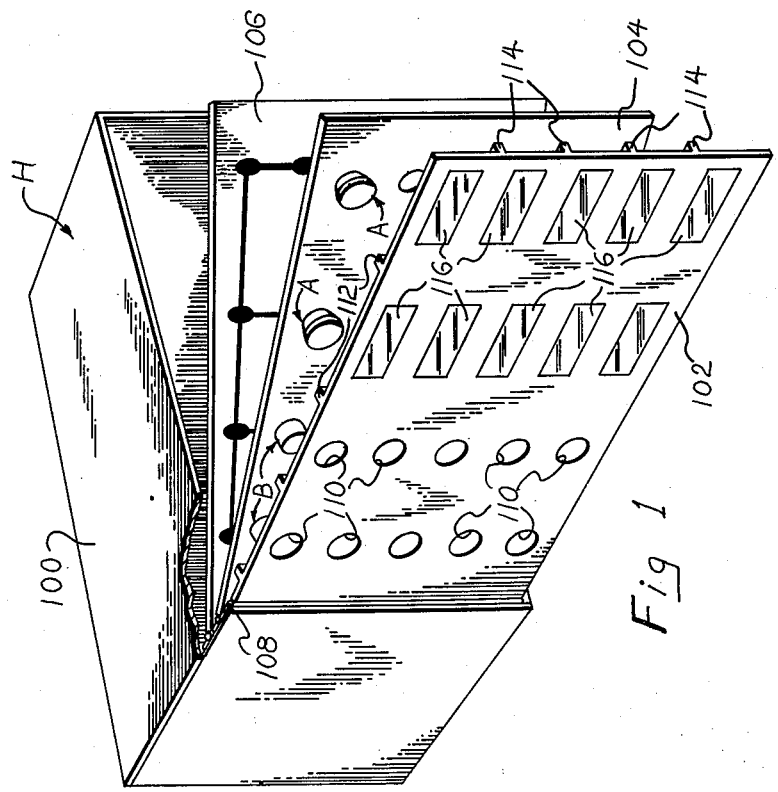
INVENTORS
FRANK O. RIGGINS
EDWARD R. SANDERS
DONALD G. WRIGHT
BY
ATTORNEYS

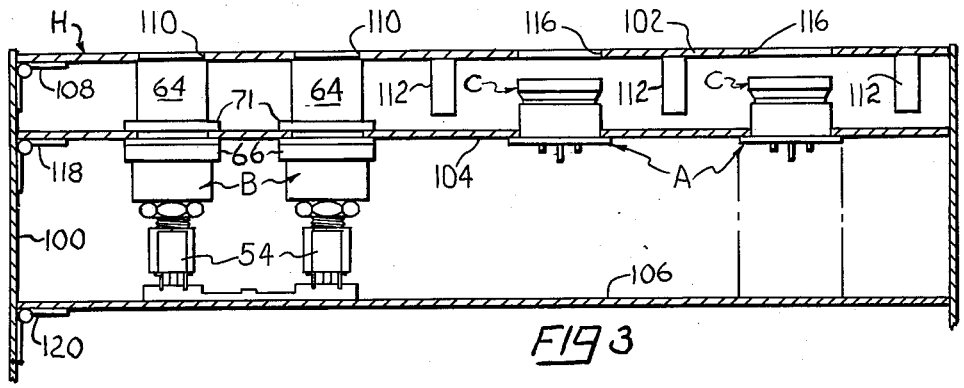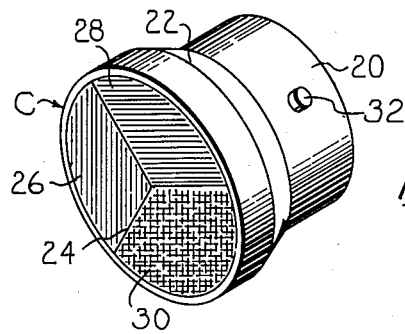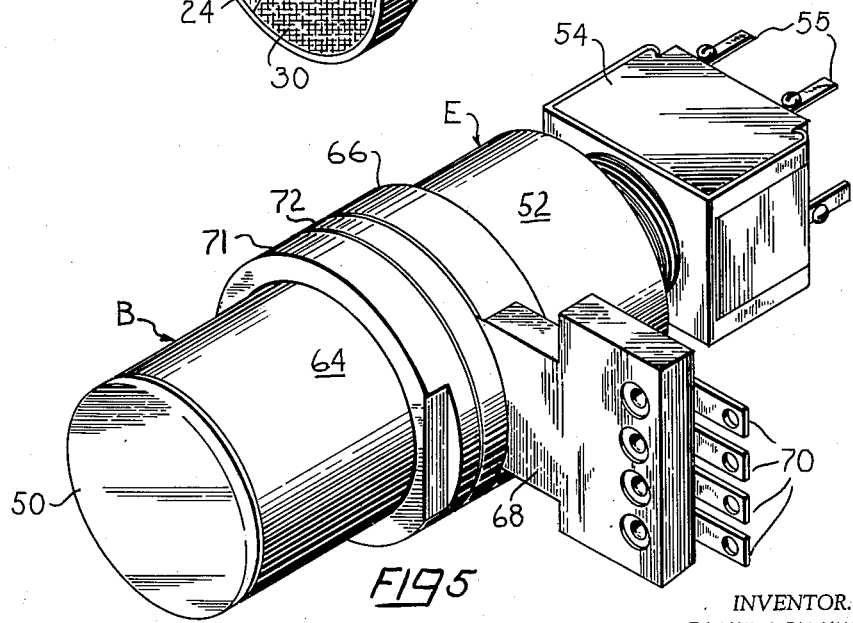

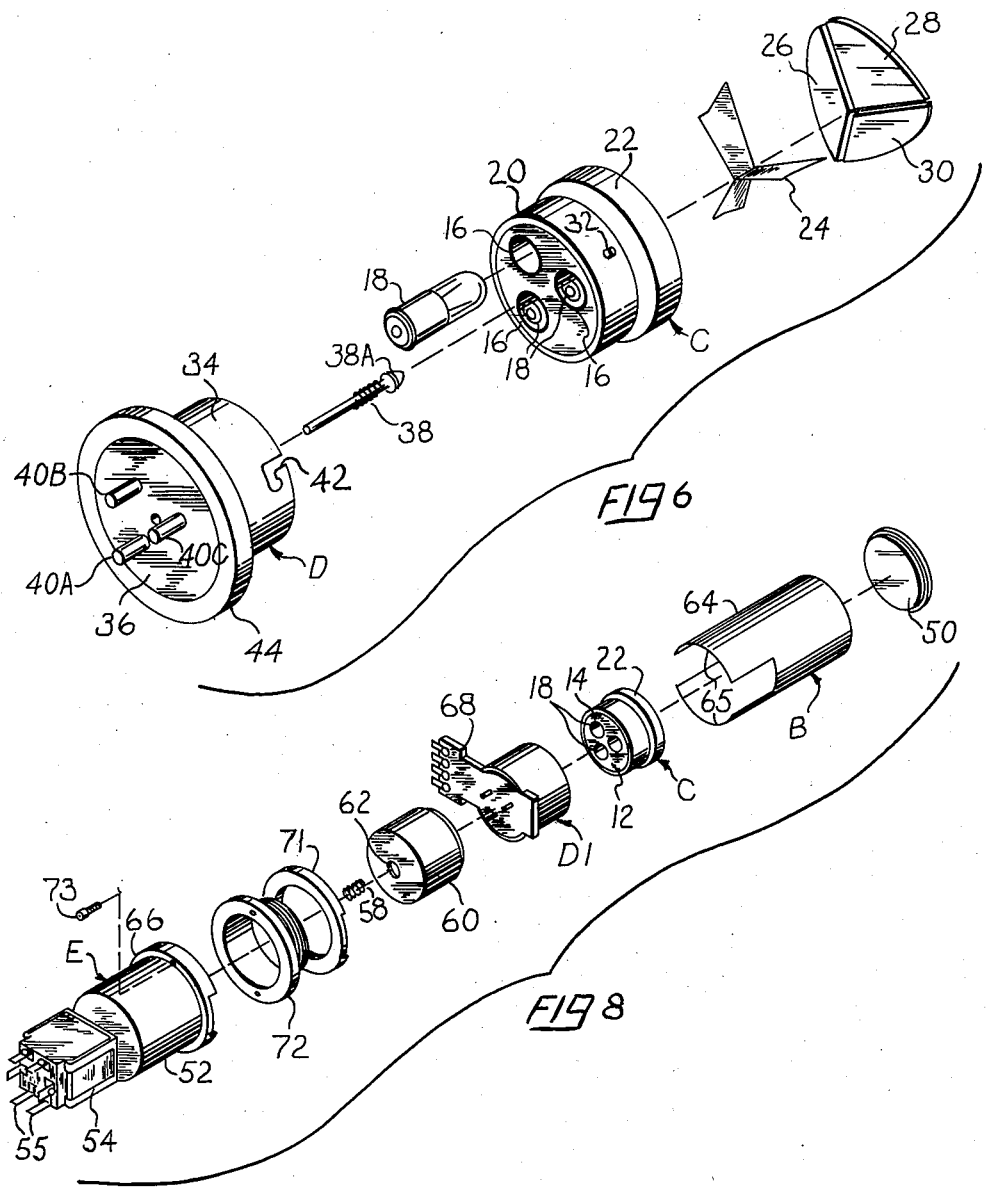

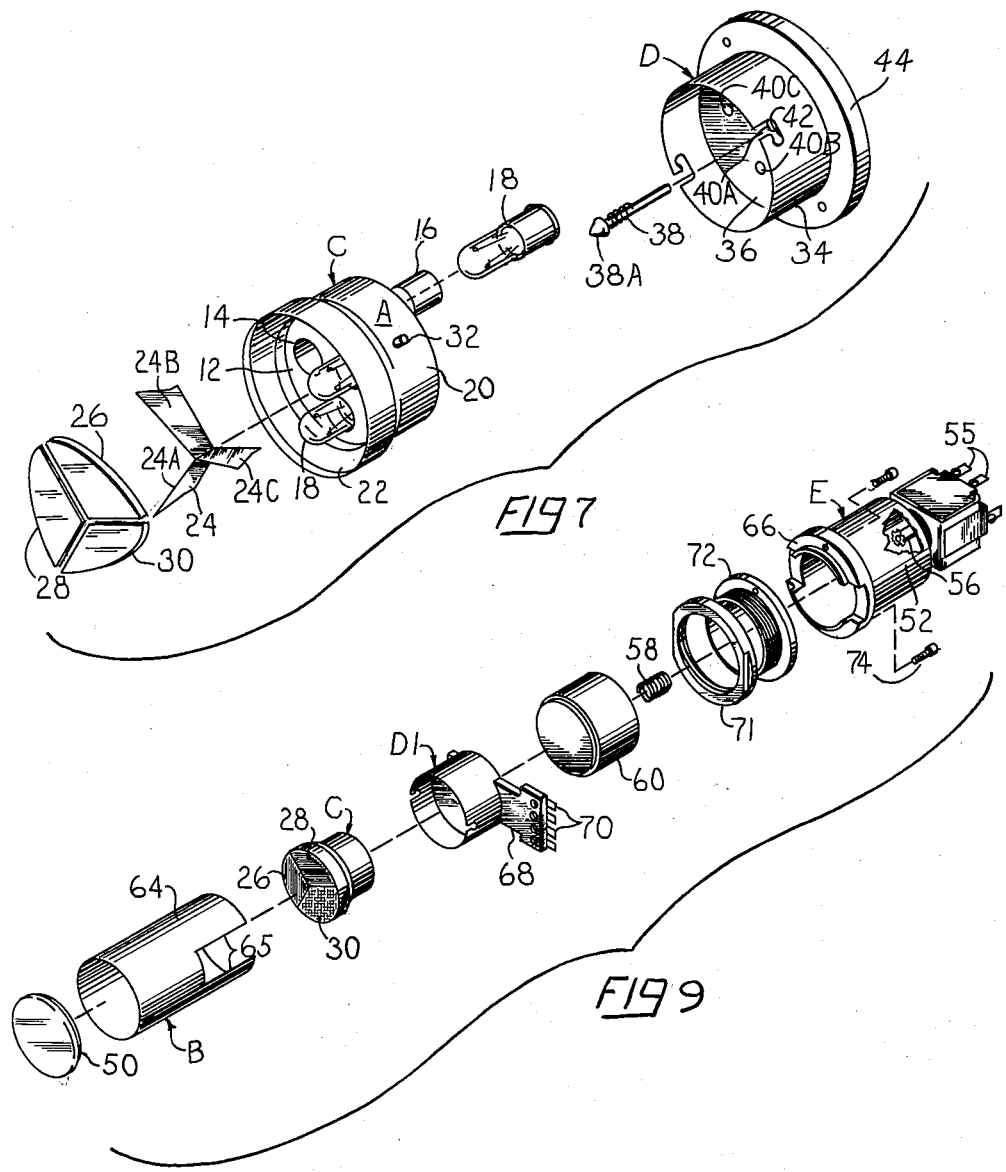

Jan. 3, 1961       F. O. RIGGINS ET AL       2,967,298
            MULTI-SELECTOR CODED ILLUMINATOR MODULE
Filed Feb. 7, 1958                            5 Sheets-Sheet 5
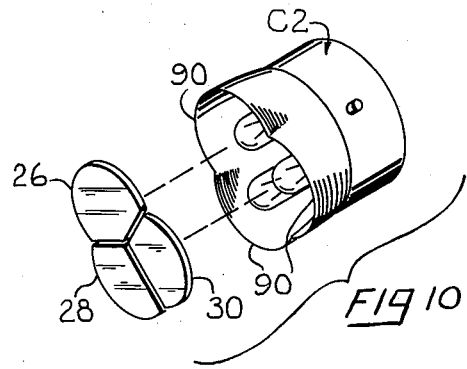
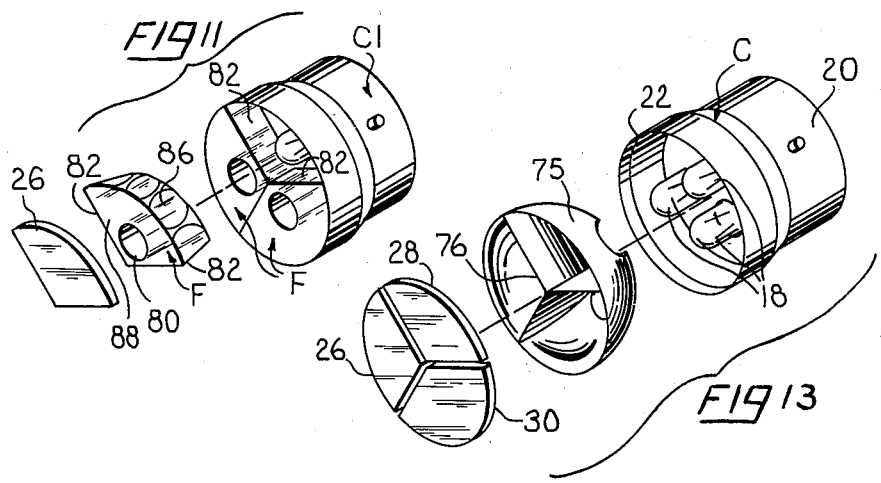
INVENTORS.
FRANK O. RIGGINS
EDWARD R. SANDERS
DONALD G. WRIGHT
BY
      ATTORNEYS United States Patent Office 2,967,298
Patented Jan. 3, 1961

1

2,967,298

MULTI-SELECTOR CODED ILLUMINATOR MODULE

Frank O. Riggins, Westmont, Edward R. Sanders, Palmyra, and Donald G. Wright, Moorestown, N.J., assignors to O & S Research, Inc., Riverton, N.J., a corporation of New Jersey Filed Feb. 7, 1958, Ser. No. 713,875

6 Claims. (Cl. 340—381)

Our invention relates to a module for multi-selected and coded illumination, and more particularly relates to a multi-lamp module for self-illuminated push-button switches and light indicators to indicate the status of remote circuitry and control elements wherein a large plurality of switches and/or indicators are incorporated in control panel assemblies or consoles.

In the present day needs for massive, central control panels to indicate and feed information to such complex networks as electronic calculators, missile sites and testing centers, it has become necessary to utilize compact multi-selected illuminator assemblies which will project light in coded colors or indications to indicate the status of action for the remote circuitry associated with indicator and/or switch elements. Since each color at a time of the illuminator must be projected upon a diffuser button or translucent screen wherein each coded beam of light will fill the entire screen surface area without interaction and confusion of a second light beam, each encapsualted lamp element must be oriented to preclude interference with another element and yet provide maximum and uniform light distribution in a selected direction upon the indicator screen.

In addition, a typical control panel utilizes, perhaps fifty or more illuminated push-button switches, which are ganged within the panel as a multi-element display, together with a similar plurality of illuminator indicating units which may or may not be associated with the push-button switch controls. Since failures may occur in the lamp elements for wiring within a particular switch or indicating illuminator, it is necessary that means be provided to permit rapid and efficient maintenance of the entire panel assembly as well as the individual components and, at the same time yield a logical presentation for a single operator or observer. Furthermore, it is desirable to incorporate a modular system for both assemblies, sub-assemblies and component elements whereby complete interchangeability is afforded and proper indexing is secured to enable rapid replacement of an assembly, sub-assembly or component element respectively if the need therefor should arise.

It, therefore, is an object of our invention to provide a modular construction for sequential-coded, illuminated, multi-element displays.

Another object of our invention is to provide a compact, multi-selected indicating illuminator which will project a coded light beam upon an associated screen in a preferential direction to indicate the status of action of a remote circuit.

Another object of our invention is to provide a multi-indicating display console to identify the status of action of a plurality of remote circuits and enable a central control therefor.

Another object of our invention is to provide a multi-color indicating illuminator which will preferentially project in a selected direction a coded colored light beam upon a diffusing screen.

2

Another object of our invention is to construct a sequential-coded, multi-color, illuminated push-button switch wherein a modular array is provided.

Another object of our invention is to provide a modular sequential-coded, multi-color projecting, illuminator which is indexed and interchangeable for use as a self-contained indicator or with a push-button switch.

Another object of our invention is to construct a sequential-coded, multi-color-projecting, illuminator wherein each lamp element will not interact or interfere with other lamp elements and will provide uniform and maximum distribution of light upon an associated diffuser button or diffuser screen.

Another object of our invention is to provide a modular sequential-coded, multi-color-projecting, display for remote circuitry wherein each component is indexed to permit rapid, efficient and interchangeable maintenance of the entire panel assembly.

Another object of our invention is to provide a sequential-coded, multi-color illuminated push-button for an electrical switch in a multi-element display panel wherein each push-button is recessed within the panel as a safety measure to prevent accidental tripping of the associated electrical switch.

Other objects of our invention are to provide an improved device of the character described, that is easily and economically produced, which is sturdy in construction, and which is highly effective in operation.

With the above and related objects in view, our invention consists in the details of construction and combination of parts, as will be more fully understood from the following description when read in conjunction with the accompanying drawings, in which:

Fig. 1 is a front perspective view of a modular, sequential-coded, multi-indicating display console embodying our invention, showing modular panels in partial open position for replacement or maintenance of interior components.

Fig. 2 is a fragmentary sectional view of the console showing the panels in closed position.

Fig. 3 is a sectional view showing the orientation of the illuminator and push button switches within the console.

Fig. 4 is a perspective view of a modular, sequential-coded, multi-indicating, projecting illuminator employed with our invention.

Fig. 5 is a perspective view of a modular, sequential-coded, multi-indicating push-button switch embodying our invention.

Fig. 6 is an exploded view of the multi-color projecting illuminator.

Fig. 7 is another exploded view of the multi-color projecting illuminator looking from the reverse direction.

Fig. 8 is an exploded view of the multi-color indicating push-button showing the modular orientation.

Fig. 9 is an exploded view of the multi-indicating push-button looking from the reverse direction.

Fig. 10 is a perspective view showing a modification of the illuminator.

Fig. 11 is a perspective view of another modification of the illuminator.

Fig. 12 is a perspective view of a fourth modification of the illuminator.

Fig. 13 is a perspective view of another modification of the illuminator.

Referring now in greater detail to the drawings in which similar reference characters refer to similar parts, we show a modular illuminator, generally designated as A, which may be modularly incorporated within a push-button switch, generally designated as B.

The illuminator A comprises a lamp cell designated as C, which is utilized to direct light in a preferred direction and interfits with a lamp cell socket, designated as D. In the embodiment shown in Fig. 6, the lamp cell C comprises a substantially cylindrical base 12 which is of an insulating material and having a plurality of cores 14 disposed radially about the axis of the cylinder. A metallic or conducting ferrule 16 is inserted as a pressed fit within each of the cores 14 and are specifically toleranced to maintain therein a lamp element 18 which is secured through surface 19 of the base. The insulated base is pressed into a shell 20 which has a reflecting flange 22 secured or integrally formed at the forward portion of the shell. The flanged portion 22 has an internal high reflecting surface which is utilized to direct light in a preferred direction from each of the lamp elements 18 as desired. A partition 24 having highly reflecting radially extending webs 24A, 24B, and 24C is secured within the shell 20 whereby a web is disposed intermediate adjacent lamp elements 18. Disposed intermediate adjacently positioned lamps 24, is a color-coded filter element 26, 28 and 30, which are secured within the shell 20 by spinning the end of the flange 22 to maintain the filters in position. Another suitable method for holding the filters accurately disposed would be by way of conventional snap rings. A pair of bayonet type pins 32 project outwardly from the sides of the shell 20 and are located out of the axis of the cylinder in order to index the filtered elements correctly when secured within the lamp cell socket D.

The lamp cell socket D comprises a cylindrical shell 34 having an internal diameter complementary with the exterior diameter of the lamp cell shell 20. Pressed within the socket shell 34 is an insulating core 36 having a spring-loaded bayonet contactor 38 axially slidable therein. A plurality of contactor pins 40A, 40B and 40C are radially positioned about the axis of the core 36 and are adapted to engage the central contact of each of the lamp elements 18 respectively positioned within the lamp cell. A pair of notches 42 are formed in the periphery of the shell 34 and are adapted to engage the pins 32 on the lamp cell C to index accordingly the filtered lamp elements. Each of the contactors 40 is suitably soldered to connecting leads from a battery-operated or electrical circuit whereby the central pin of the lamp elements 18 have one side electrically closed. The spring-loaded bayonet pin 38 has a flexible lead thereon connecting the other side of the power source and the bayonet pin 38 has an upper conical surface 38A which is adapted to engage resiliently the periphery of the ferrules 16 and so provides a common center tap or ground for the three lamp elements to complete each lamp circuit. Integrally formed on the rear portion of the shell 34 is a peripheral flange ring 44 which provides a means for mounting the illuminator A by securing screws upon a panel such as is shown in Fig. 4.

To illustrate the operation of the illuminator A, each of the lamps 18 is mounted within the illuminator which is wired so as to incorporate by reference the status of action of a remote circuit. For example, if the remote circuit to which a particular illuminator refers is operating satisfactorily at a distant location, one lamp 18 will be lighted to transmit a light beam through coded filter 26 which for illustration may be colored green. If this remote circuit, such as electrically operated valve, fuel pump or bias of an electrical circuit, should fail in some manner, a signal would be transmitted to the illuminator causing the first lamp to become extinguished and a second lamp to become lighted, the second lamp having a red color coded filter element 28. Thus, an indicating signal would be projected from the illuminator upon a suitable translucent diffuser screen on a panel to visually advise an observer or operator of the panel that the remote circuitry had failed and that it was necessary to switch in either an auxiliary circuit or discontinue operation. If the operator were to relay to the remote position or to switch in himself an auxiliary circuit of identical proportions to the primary circuit, the both first two lamps colored green and red filter elements 26 and 28 respectively, would be extinguished and a third filter element colored yellow, for example, would be projected upon the surface to indicate that the remote circuit was utilizing a supplementary or auxiliary channel. As is easily seen, each beam projected through the respective colored filter could be so directed to either uniformly illuminate a screen immediately beyond the illuminator A or to direct a small unfiltered beam or spot of light upon some portion of the screen such as a circumferential clock-type indication by proper selection of the reflecting surface of the flange 22. Further consideration of modifications of the embodiment set forth immediately above will be amplified in a later portion of this specification.

It is to be further indicated that should one of the lamps fail after an illuminator module had been assembled in the panel and the lamp cell C could be removed by twisting and withdrawing it from the socket D. Each or any of the lamp elements 18 could then be easily withdrawn from the rear of the lamp cell itself.

Referring to Figs. 5, 8 and 9, we show the illuminator A modularly incorporated within the push button switch B. The illuminated push button switch B comprises a housing, generally designated as E, into which the entire illuminator is mounted as projecting assembly for utilization both to change and actuate the remote circuit in which it is connected as well as to indicate by projected illumination upon a diffusion button 50 at the forward portion thereof.

The housing E comprises a hollow cylindrical case 52 having at its rear surface thereof mounted a conventional micro-switch 54 which contains a plurality of terminals 55 either electrically connected to a remote circuitry, to a panel circuit, or to a printed circuit, as will be more fully set forth hereinafter. The interior chamber of the housing case 52 has a metallic grommet 56 which is directly coupled to and actuates the micro-switch internal contacts (not shown). A helical spring 58 is detachably held within the grommet and an actuator 60 of cylindrical proportions complementary with the interior of the case 52 has a circular bore 62 in its lower surface for retaining the helical spring 58 in position. The actuator 60 is slidable within the interior case 52 and resiliently compresses the spring 58 to actuate the internal contacts of the micro-switch 54 (not shown). A plunger 64 of tubular construction having a pair of spaced tongues 65 at one end thereof in engagement with the top of the actuator longitudinally depresses the said actuator when the button 50 is pushed by a person's finger.

It is to be observed the notches defined by the spaces intermediate the tongues 65 act as a relief for the flange 68 of the socket D1 when the plunger 64 is depressed.

The illuminator A is longitudinally supported intermediate the plunger 64 and the housing E, the latter having a mounting ring 66 integrally formed thereon and notched to receive the rectangular flange 68 on the special lamp socket D1. The flange 68 performs a mounting function and also is provided with a plurality of printed conductive strips, each connecting a given external terminal 70 to a given contactor 40. A retainer 72 is secured upon the housing E by a plurality of circumferentially spaced screws 74 and maintains the socket D1 securely in position and detachable only from the rear of the ring 66. A spanner nut 71 maintains the push button switch B upon the mounting panel.

The lamp cell C is identical with the construction as set forth above under the description of the illuminator A. However, it is to be understood that a number of modifications of the lamp cell is desirable and utilized to perform special operations for directing light in a preferred and/or color coded direction in both the illuminator A and the push button switch B.

For example, as set forth in Figs. 6, 7, 8 and 9, the shell of the lamp cell is shown as arcuate. However, this arcuate construction may be parabolic to project a beam of parallel light therefrom when the filament of each lamp is located in the focal plane thereof. It is also possible that the reflecting surface 22 of the lamp cell C may be spherical, conical or multi-faceted in order to diverge, converge or scatter the reflected light beam therefrom as the filament of the lamp bulbs are positioned beyond or interior of the focal plane. In addition, a reflector 75 having partition walls 76 integrally formed therein, may be secured within the flange portion 22, as shown in Fig. 13. Again, the configuration of the reflector 75 may be parabolic, spherical, conical or multi-faceted to direct the light beam from each lamp in a selected and/or preferred manner.

In the embodiment shown in Figs. 6, 7, 8 and 9, the filter elements 26, 28 and 30 are pyramidally or angularly disposed with relation to the axis of the illuminator whereby maximum uniform projection of light will be imaged upon the segment of the screen or diffuser button 50, 180° from the encapsulated lamp to permit reflections angularly disposed and optimally directed.

In Fig. 11, we show a modification of the illuminator wherein a lamp cell C1 has a plurality of prismatic segments F, each segment having a bore 80 therein for encapsulating a lamp element 18. Each of the prismatic segments F are aluminized or silvered at their leg portions 82 thereof whereby each reflecting leg surface acts as an infinitesimal partition web and further reflects light beams from the lamp filaments to the hypotenuse surface 86, it being understood that the prismatic segment is essentially triangular in configuration. The hypotenuse surface 86 may be parabolic, spherical, conical or multi-faceted in order to direct light in the desired manner and each hypotenuse surface 86 is aluminized or silvered to act as a back surface mirror. As has been described the prismatic segments F operate and function in substantially the same manner as the reflecting portion 22 and filter elements may be secured to the upper flat surface 88 of the prismatic segments F co-planar therewith or oriented angularly with respect to the longitudinal axis of the lamp cell.

In Fig. 10 we show another modification C2 of the illuminator wherein the reflecting surface of the shell comprises a plurality of reflecting buds 90 each of which is a parabolic sector defined by a lamp element located at the focal point thereof. In this configuration the axis of each parabolic bud 90 is canted with respect to the longitudinal axis of the lamp cell whereby the light beam directed therefrom will be angularly disposed to illuminate the entire surface of the screen or diffusing button.

In Fig. 13, we show another modification C3 wherein a plurality of reflecting arcuate cups 92, 94 and 96 preferably of parabolic or spherical configuration are disposed peripherally about the cell axis and each cup encapsulates one lamp element whereby the focal plane of each cup is behind the point of the lamp filament so that a spot of light, unfiltered, will be projected upon the screen or diffuser button. Since the axis of each of the cups 95 are radially disposed about the axis of the lamp cell, a spot of light from each reflecting cup will be imaged circumferentially upon the diffuser screen and the indication signal will be read as a clock face.

In Figs. 1, 2 and 3, we show a console or modular panel H which is utilized and specifically constructed to be used with our modular multi-selector illuminator or push button modules. The console H comprises a box or container 100, substantially rectangular in construction and having an open-front side. Interiorly disposed and hinged within the container H is a console facia 102, a panel 104 for mounting the modular units and a printed circuit board 106. The console facia is independently hinged at 108 and is substantially rectangular in plan configuration and is of translucent plastic construction. A plurality of apertures 110 for permitting access to the push button modules B are disposed in the facia 102. Integrally formed at the rear of the facia are a plurality of vertically spaced webs 112 and intersecting therewith a plurality of horizontally spaced webs 114 to define an egg crate construction. The front of the facia is blackened over the entire area with the exception of areas defining windows or screens 116 for projection thereupon by each illuminator A.

The panel 104 is of rectangular construction and hinged at a location 118 spaced from the hinges 108, and contains a plurality of mounting holes therein for securing each of the respective illuminators A and push button switches B whereby each of the illuminators will be positioned directly behind and spaced from their respective windows 116. Each of the push button switches B will be located directly behind a respective aperture 110 so that the plunger 64 thereof will be recessed from the front of the panel 102 as a safety measure to prevent accidental actuation of the said switches.

It is to be observed that the printed circuit board 106 is hingedly mounted at 120 spaced from and directly behind modular panel 104. The face of the printed circuit panel has elevation such as sockets to directly engage the terminals 40 of the illuminators A and corresponding recesses for engagement with the terminals 55 of each of the respective push button switches.

It is easily seen that by opening the facia 102 that the front of each of the illuminators A and push button switches B become accessible simply by turning the said facia upon its hinges. Correspondingly the modular panel 104 is likewise hingedly opened to permit access to the printed circuit board 106 or to the rear of the respective illuminators and/or switches. To obtain access to the interior of the illuminators the lamp cell is twisted and brought forwardly by releasing the bayonet pins from the notches from the sides of the cell sockets. All lamps 18 are removable from the rear portion of the lamp cell.

The push button switches B are removed from their mounting holes by turning the flange ring 66 and unthreading it from the cell housing E. This will permit access to the interior illuminators A contained within the cell which are in themselves made available for repair and replacement of the lamp element 18 as set forth above under illuminators.

It is also to be observed that access to the lamp cells C may be made from the front portion of the push button switches B simply by withdrawing the plunger 64 from the forward portion of the push button. In this connection, it is to be noted that the plunger 64 is merely slidably positioned within the housing E and not locked therein, but is maintained in position within the housing by abutting the console facia 102 against the diffuser button 50. When the plunger 64 is removed, the flange 22 of the lamp cell C projects forwardly of the retainer 72 thereby enabling removal of the lamp cell C from the lamp socket D by turning and withdrawing the former therefrom. The unlocked construction of the plunger 64 permits that all lamp parts may be removed from the front of the push button switch B.

Although our invention has been described in considerable detail, such description is intended as being illustrative rather than limiting, since the invention may be variously embodied, and the scope of the invention is to be determined as claimed.

We claim:

1. A modular, color-coded projecting illuminator comprising a cylindrical insulating base; a plurality of cored openings extending therethrough from front to rear, radially spaced about the longitudinal axis thereof, each of said openings adapted to retain therein a lamp element having both a circumferential terminal contact and an axial terminal contact; a cylindrical shell mounted on and peripherally secured about said insulating base, said shell including an integral flange flared outwardly therefrom; partition webs mounted within said shell dividing the front face of said base into a plurality of segments, said web extending radially intermediate adjacent lamp receiving openings; a color-coded filter element mounted across adjacent spaced partition webs; and a reflector within said flange adapted to project a beam of light from a given lamp element through a given filter element.

2. The illuminator of claim 1 wherein said webs have reflecting surfaces.

3. The illuminator of claim 1 which further includes a generally cylindrical socket complementary to said cylindrical shell; means whereby said socket may be releasably secured to said shell; a plurality of contactors within said socket, insulated from each other and in registration with the axial terminal contacts of said lamp elements; and a spring-loaded contactor having a conical head axially slideable within said socket, said conical head adapted to simultaneously contact the circumferential terminal contacts of all of said lamp elements.

4. The illuminator of claim 3 which further includes a tubular casing mounted thereabout, said casing being slideably moveable with respect to said cylindrical insulating base; and a switch mounted behind said socket, movement of said casing with respect to said socket operating said switch.

5. The invention of claim 4 wherein, further, the end of said tubular casing remote from said socket is provided with a circular diffuser screen, whereby the entire surface of said screen is lighted by said illuminator.

6. The invention of claim 4 wherein said partition webs are lamp encapsulating prisms having a generally segmental shape.

References Cited in the file of this patent

UNITED STATES PATENTS

| | | |
|---|---|---|
| 2,096,190 | Moeller | Oct. 19, 1937 |
| 2,127,887 | Rayburn | Aug. 23, 1938 |
| 2,217,526 | Pelikan | Oct. 8, 1940 |
| 2,295,301 | Smith | Sept. 8, 1942 |
| 2,424,574 | Marco | July 29, 1947 |
| 2,507,921 | Merkel | May 16, 1950 |
| 2,579,618 | Scofield | Dec. 25, 1951 |
| 2,610,237 | Benner | Sept. 9, 1952 |
| 2,703,398 | Harrington et al. | Mar. 1, 1955 |
| 2,725,552 | Hyde et al. | Nov. 29, 1955 |